H. ANDRIESSENS.
PROCESS FOR CARRYING THROUGH CHEMICAL GAS REACTIONS BY MEANS OF AN ENLARGED ELECTRICAL DISCHARGE.
APPLICATION FILED JULY 17, 1912.
1,058,653. Patented Apr. 8, 1913.
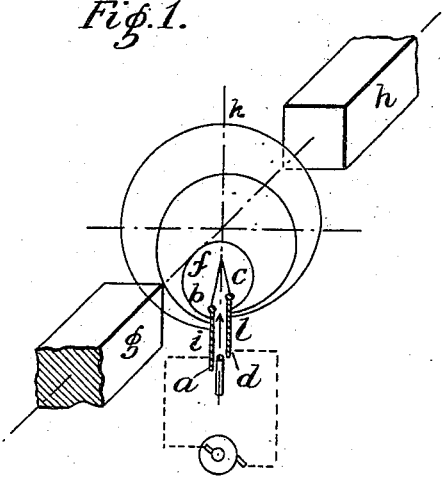
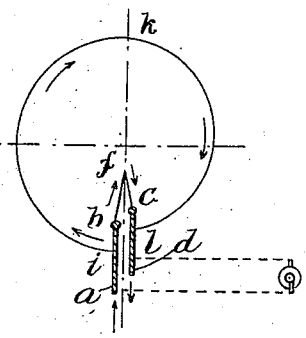
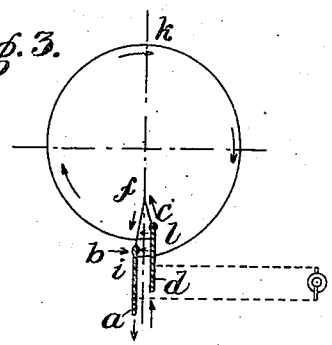
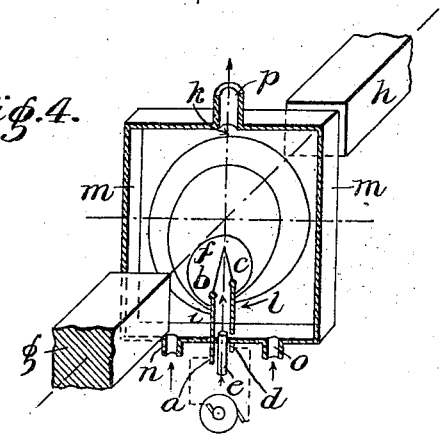
Attest:
Inventor:
Hugo Andriessens
by
Atty

UNITED STATES PATENT OFFICE.

HUGO ANDRIESSENS, OF MUNICH, GERMANY.

PROCESS FOR CARRYING THROUGH CHEMICAL GAS REACTIONS BY MEANS OF AN ENLARGED ELECTRICAL DISCHARGE.

1,058,853.

Specification of Letters Patent.  Patented Apr. 8, 1913.

Application filed July 17, 1912. Serial No. 710,043.

*To all whom it may concern:*

Be it known that I, HUGO ANDRIESSENS, a subject of the Queen of the Netherlands, and residing at Munich, Bavaria, Germany, have invented certain new and useful Improvements in Processes for Carrying Through Chemical Gas Reactions by Means of an Enlarged Electrical Discharge, of which the following is a specification.

My invention relates to a method of, and apparatus for, treating gases, and has especial reference to the treatment of gases, for the purpose of producing gaseous reactions, in an electric furnace wherein an electric arc flame is subjected to the action of suitable magnetic means to spread the flame within the reaction chamber of the furnace.

To obtain the requisite concentration and consequent high yield in the treatment of gases, as in the oxidation of the nitrogen contained in air, it is essential that the arc flame, within the furnace, be extended linearly or lengthened to as great an extent as possible, and that the surface over which the extended flame spreads (the so-called volume of flame) be as small as possible, consistent with effective operation.

It has been found that with a given maximum linear extension of the arc, the greater the volume of the flame the greater will be the destruction of the oxids of nitrogen formed by the reaction taking place within the furnace chamber. This is due to the fact that the excessively high temperature in the furnace chamber will tend to prevent or hinder the cooling of the products of reaction directly in proportion to the length of time they remain in this excessively heated chamber, and to prevent the retardation of the products of the reaction within the furnace chamber, the arc is spread sufficiently to allow of the reactions taking place, without the arc being so spread as to impede the passage of the products of combustion out of the chamber.

The principal object of my invention is to provide a novel method and apparatus for treating gases wherein the essentials to successful operation, as above defined, are present in a degree not heretofore attained.

The underlying principle of the invention resides in the production of a high tension arc, the discharge being caused to take a substantially zig-zag shaped path, and the arc being electro-magnetically spread over a surface which is practically always constant in extent, and the spreading action being independent of the alternating directions of the electric current emanating from the source used to produce the arc.

In carrying my novel method of treating gases into practice, I produce a high tension electric arc which is subjected to the flow or blast of a suitable medium, such as air, gas, or vapor, whereby the electric discharge is caused to take a substantially zig-zag shaped path, the deformed arc is subjected to unidirectional lines of magnetic force to spread the arc linearly to as great an extent, and over as small a surface, as possible, and thereafter the gases to be treated are passed over or through the spread arc, to effect the desired reactions.

The novel method above referred to may be successfully carried out with various kinds of apparatus, but I have found the apparatus illustrated in the accompanying drawing to be best suited to the purpose.

In the drawing: Figure 1 is a diagrammatic view of the preferred form of apparatus; Figs. 2 and 3 are similar views, the electromagnet being omitted; and Fig. 4 is a perspective view, parts appearing in section.

Referring by reference characters to the drawing, $m$ designates the furnace casing, of refractory material, through the lower wall of which the electrodes $ab$ and $cd$ project a relatively short distance into the reaction chamber of the furnace. In practice the electrodes are separated but a few millimeters from each other. Opening into the casing $m$, preferably through the lower wall thereof, are the ducts or tubes $n$ and $o$, through which the bulk of the air to be treated is introduced into the reaction chamber, the air after treatment passing out through the discharge tube $p$ in the upper wall of the casing $m$.

Arranged between the electrodes, which are included in an electric circuit as shown, is a nozzle $e$, which serves to conduct the air, gases or vapors to the arc formed between the dischargs ends of the electrodes. At right angles to the reaction chamber of the furnace are the poles $g$ and $h$ of a powerful direct current magnet, the axis of which is substantially at right angles to the axes of the electrodes.

If, now, electric current, preferably alternating current, be caused to flow through the electrodes *ab* and *cd*, a high tension arc will be produced between the ends *b* and *c*, and if a current or blast of air, vapor or gas, be projected through the nozzle *e* against the arc, the latter will assume the substantially zig-zag shape defined by the lines *b*, *f*, *c*. While, possibly, the arc may not have the precise form *b*, *f*, *c*, it will be understood that immediately following each current alternation substantially this form of the arc will be produced.

When the arc has been deformed as described, the unidirectional magnetic lines of force from the poles *g* and *h* of the powerful electromagnet will traverse the zig-zag shaped parts *b*, *f* and *f c* of the arc. The result of this is that the arc is spread, in the form of a closed circle which constantly increases in size, over a surface the periphery of which is defined by the helical line *i k l* which is at right angles to lines drawn through the poles *g*, *h*, and the electrode ends *b*, *c*. This line may be fifteen feet in length, or more. The flame has the appearance of a relatively small, round, but intense flame disk, although the arc actually expands to maximum and becomes extinguished with each alternation of the current which produces the arc.

It is immaterial whether the direction of the high tension current is *b f c*, or whether it flows in the reverse direction *c f b;* the surface over which the flame spreads remains practically constant in extent. Corresponding to the direction of the current producing the high tension arc, the latter will spread either as indicated by the arrow in Fig. 2 or as indicated by the arrow in Fig. 3, and it will thus be noted that it is immaterial whether the arc is produced by alternating or by direct current. In this connection I desire to emphasize the fact that unless the arc be subjected to the flow or blast through the nozzle *e*, between the points *b* and *c* and thus deformed to produce the zig-zag shaped arc or band of flame, the magnetic lines of force could not cut the arc and, of course, the latter could not be spread out to form a flame.

The circle, formed by the lines of force of the magnet cutting the arc, is not actually visible to the eye, as such circle is formed, expanded to its maximum extent and rotated at right angles to its initial position, at each current alternation, although the flame appears to have a substantially constant surface or volume.

The gas or air to be treated may be introduced into the reaction chamber of the furnace in any of the ways well known in the art. In the drawing the tubes *n* and *o* serve for the introduction of air or gas, the object being simply that the gas or air be subjected to the action of the deformed arc within the furnace. Corresponding to the method of introducing the gas, and the position and width or form of the electrodes, the line *i k l* will assume the shape of the sector of a circle, or that of a practically closed circle, the periphery of a leaf or the like.

From the foregoing description it will be noted that by my novel method and apparatus, I am enabled to extend or lengthen the arc linearly to a very great extent and to spread the same over as small a surface or area as possible, whereby a large yield of the substance treated is obtained in a relatively short space of time.

Having thus described my invention, what I claim as new and desire to secure by Letters Patent is:—

1. The herein described method of producing gaseous reactions, which method consists in forming a high tension arc flame, blowing a suitable medium against said arc whereby the same is deformed and elevated above normal, subjecting said deformed arc to the action of a magnetic field of force the magnetic lines of force of which extend in a direction at right angles to that in which the arc is deformed, whereby said arc is extended linearly and spread in substantially disk form over a restricted surface or area, and conducting the gas to be treated to the spread arc.

2. The herein described method of producing gaseous reactions, which method consists in forming a high tension arc flame, blowing a suitable medium against said arc whereby the same is deformed and elevated above normal, subjecting said deformed arc to the action of a magnetic field of force whereby said arc is extended linearly and rotated into a plane at right angles to the plane of its original deformation and conducting the gas to be treated to such arc.

3. The herein described method of producing gaseous reactions, which method consists in forming a high tension arc flame, conducting a current of air against said arc at a point intermediate its ends whereby said arc is deformed and elevated above normal, subjecting said deformed arc to the action of unidirectional lines of magnetic force extending in a direction at right angles to the direction in which said arc is deformed whereby said arc is greatly lengthened and spread in substantially disk form over a relatively restricted surface or area, and conducting the gas to be treated to the spread arc.

4. A gas reaction furnace, embodying therein a furnace casing containing a reaction chamber, means for producing a high tension arc flame within the reaction chamber, means whereby the arc flame is deformed and elevated above normal, means for producing magnetic lines of force to cut said arc and spread the same in a plane substantially at right angles to the plane of the means for producing the arc, and means for introducing the matter to be treated in the reaction chamber.

5. A gas reaction furnace, embodying therein a furnace casing containing a reaction chamber, means for producing a high tension arc flame within the reaction chamber, means for directing an air blast against said arc intermediate its ends whereby said arc is deformed and elevated above normal, means for producing magnetic lines of force to cut said arc and spread the same in a plane substantially at right angles to the plane of the means for producing the arc, and means for introducing the matter to be treated in the reaction chamber.

6. A gas reaction furnace, embodying therein a furnace casing containing a reaction chamber, means including closely adjacent electrodes for producing an alternating current arc within said chamber, means for directing an air blast against said arc to deform said arc and elevate it above normal, and a magnet having the plane which joins its poles passing through said arc, whereby unidirectional magnetic lines of force passing between the poles of said magnet spread said arc in a plane substantially at right angles to the first mentioned plane.

In testimony whereof I affix my signature in presence of two witnesses.

HUGO ANDRIESSENS.

Witnesses:
 CAROLINA STANLITZ,
 A. U. CINSARLY.

---

Copies of this patent may be obtained for five cents each, by addressing the "Commissioner of Patents, Washington, D. C."